United States Patent Office 3,210,041
Patented Oct. 5, 1965

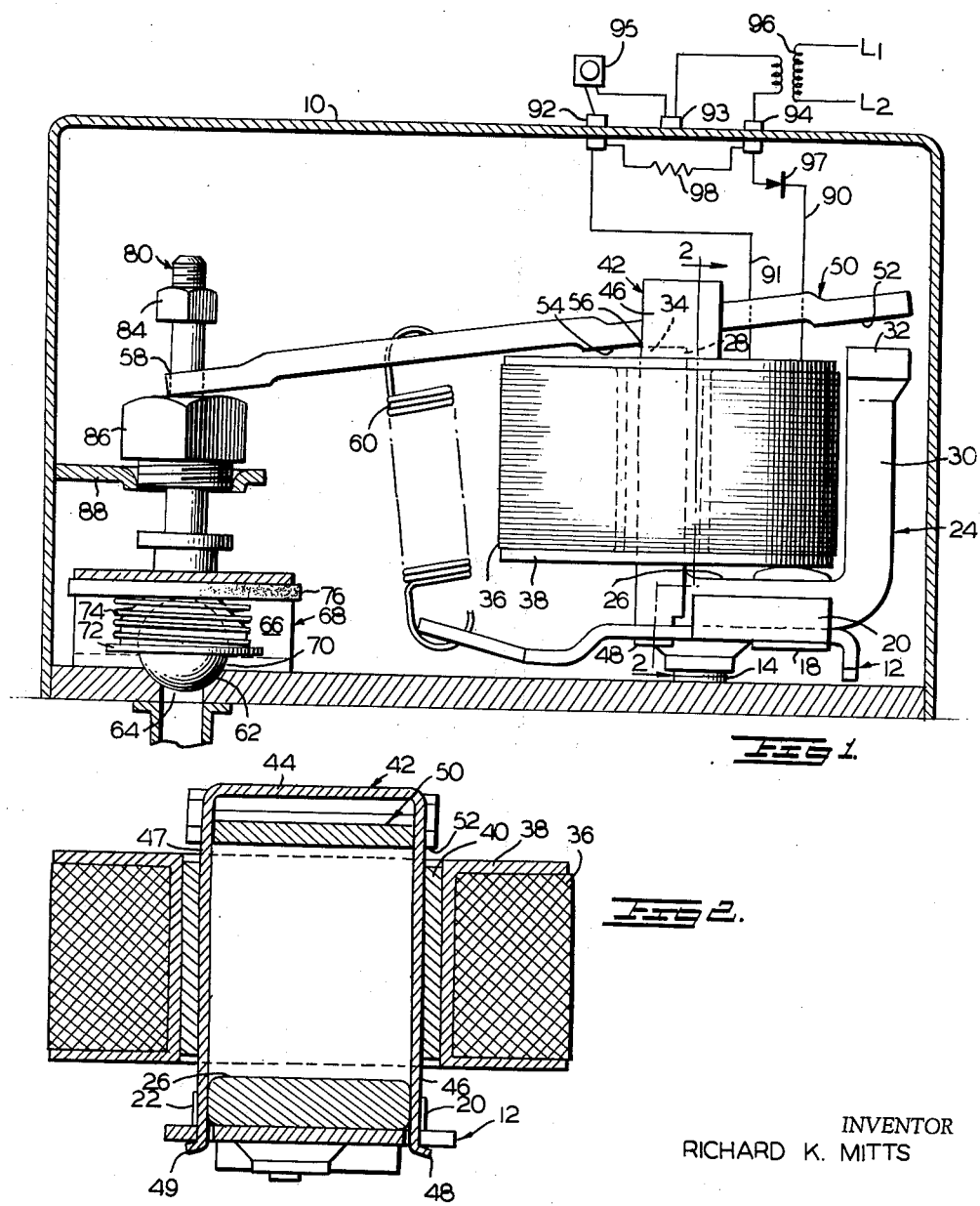

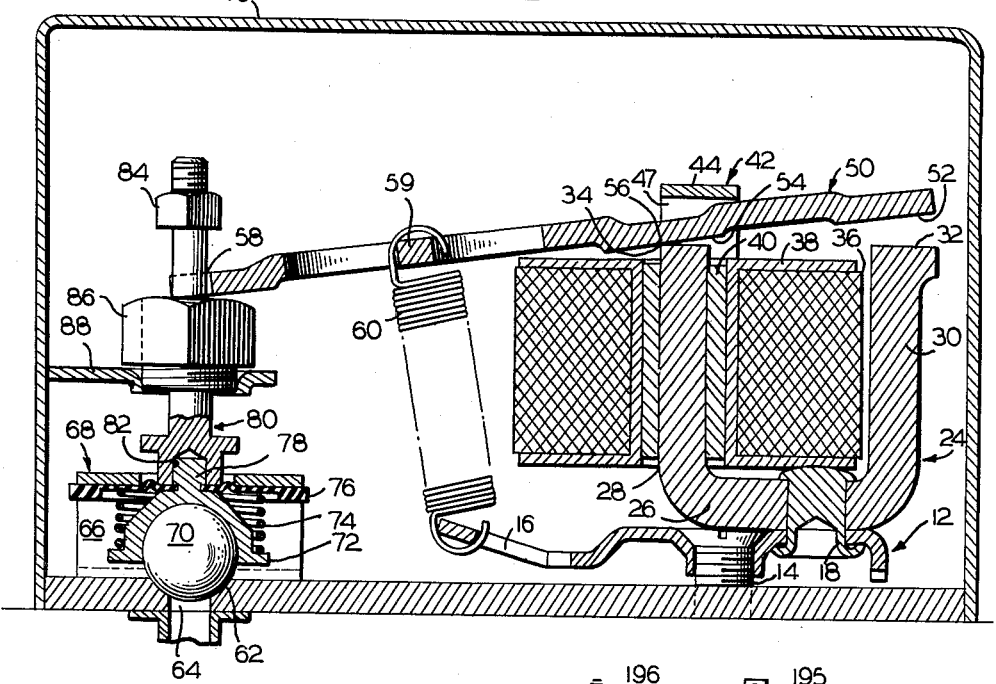

3,210,041
ELECTROMAGNETIC ACTUATOR
Richard K. Mitts, Huntington Beach, Calif., assignor to Robertshaw Controls Company, Richmond, Va., a corporation of Delaware
Filed July 30, 1962, Ser. No. 213,493
10 Claims. (Cl. 251—138)

This invention relates to an electromagnetic actuator for control devices and more particularly to such an actuator utilized with a bi-polar magnet core.

An object of this invention is to provide an electromagnetic actuator with an inertial force for operation thereof.

Another object of this invention is to increase the operating force in the keeper element of an electromagnetic actuator.

It is another object of this invention to retard demagnetization on pulsation decay in an electromagnetic control device operating on pulsating direct current.

Another object of this invention is to minimize keeper vibration and noise in an electromagnetic device operating on pulsating direct current.

This invention has another object in that the components of an electromagnetic actuator are constructed into a unitary, compact assembly.

Another object of this invention is to utilize a lost motion connection between an electromagnetic actuator and a control element.

It is a further object of this invention to utilize the pole face of a magnet core as a fulcrum for a keeper element.

A further object of this invention is to maintain the fulcrum on a bi-polar magnet core in proper alignment with the pivot axis of a keeper element.

In carrying out this invention, a keeper element is movably mounted on a magnet core in response to energization of an electric coil on the core, and means interconnecting the keeper element with a control element causes operation of the control element to a controlling position with an inertial force.

Other objects and advantages of the present invention and the manner in which they are achieved will become apparent from the following description taken in connection with the accompanying drawing wherein:

FIG. 1 is a front elevation with parts in section of a control device embodying this invention;

FIG. 2 is a section view taken along line 2—2 of FIG. 1;

FIG. 3 is a view similar to FIG. 1 with additional parts shown in section; and

FIG. 4 is a view similar to FIG. 1 with the control device in a different operating position and adapted for thermocouple control.

Referring now to FIG. 1, a control device embodying this invention includes a casing 10 in which the electromagnet assembly is mounted. A generally rectangular mounting bracket 12 is secured to the bottom of casing 10 by any suitable fastening means such as threaded bolt 14. As is shown in FIG. 3, the bracket 12 has an opening 16 adjacent its left end and another opening for receiving a rivet 18 adjacent its right end. Along each side edge, the bracket 12 has an upwardly crimped tab 20, 22.

A magnet 24 has a base 26 and a pair of vertically extending poles 28 and 30 to conform to a U-shaped configuration in cross section. An aperture in the magnet base 26 receives the rivet 18 which secures the magnet 24 to the mounting bracket 12. The bracket tabs 20, 22 are crimped toward each other into engagement with the sides of the magnet base 26 and prevent the magnet 24 from rotation. The top of magnet pole 30 is enlarged to provide an increased pole area 32 which increases the pulling force during magnet energization. The pole area 32 and the top of magnet pole 28 are ground flat and the leading edge of magnet pole 28 constitutes a fulcrum 34 for a purpose to be described more fully hereinafter.

As is illustrated in FIG. 3, an electric coil 36 is wound on bobbin 38 that is molded of a suitable insulating material, such as "Nylon." The bobbin 38 has a generally rectangular opening so as to be mounted on the magnet pole 28 and in FIGS. 1, 2 and 3, a lag coil 40 surrounds the pole 28 so as to be disposed between the bobbin 38 and the electric coil 36. The lag coil 40 is an aluminum tube extruded into a rectangular configuration to conform to the shape of magnet pole 28.

An inverted U-shaped retainer 42 has a top portion 44 and side legs 46–47 which straddle the opposite sides of the magnet pole 28. As best seen in FIG. 2, the lower ends of the retainer legs 46–47 are reduced and extend through suitable openings in the bracket 12 after which they are deformed into locking tabs 48–49. The retainer top 44 is spaced above the pole face fulcrum 34 so as to permit sufficient clearance for the pivotal movement of a keeper element 50 on the fulcrum 34.

The keeper 50 is an elongated plate made of any suitable material so as to be magnetically attracted to the magnet 24. One end 52 of keeper 50 cooperates with the enlarged pole face 32 of the magnet pole 30 and a central portion 54 cooperates with the face of magnet pole 28. The central portion 54 has a pivotal axis 56 which engages the fulcrum edge 34 on the face of magnet pole 28 for pivotal movement thereabout. The left end of keeper 50 as viewed in FIG. 3 has a substantially semi-circular notch defining a generally bifurcated portion 58 for a purpose to be described more fully hereinafter. To the left of the pivotal axis 56 as viewed in FIG. 3, the keeper 50 has a pair of openings joined by a connecting piece 59 which receives a looped end of tension coil spring 60. An opposite looped end of coil spring 60 is connected to the left end of bracket 12 by extending through the bracket aperture 16.

The electromagnetic actuator assembly described above controls the operation of a control device valve by controlling the movement of a valve member relative to its valve seat. The valve seat 62 establishes communication between a port 64 and the valve chamber 66 of a valve housing indicated schematically at 68 which is secured to the interior bottom wall of casing 10. Another port (not shown) is provided in one of the walls of the housing 68. A flow of fluid between the two ports is controlled by a ball type valve member 70 which is press-fitted into a valve holder 72. A coil spring 74 surrounds the holder 72 and is mounted in compression between a circumferential flange on the lower exterior of the holder 72 and a diaphragm gasket 76 on the interior top wall of the housing 68. The flexible diaphragm gasket 76 seals the periphery of the housing 68 and has a central opening snugly receiving a necked down portion on the stem 78 of the holder 72. The central portion of the diaphragm gasket 76 and the holder stem 78 reciprocate through an opening in the top wall of housing 68 during valve movement.

A valve stem, indicated generally at 80, has an enlarged socket portion 82 on its lower end, into which the holder stem 78 is secured as by a press fit. The central portion of diaphragm gasket 76 is compressed between the peripheral bottom wall of socket 82 and the top of holder 72 to seal the opening in the top wall of housing 68. It is apparent that the central portion of the diaphragm gasket 76 flexes during valve movement and that the valve stem socket 82 and valve holder stem 78 reciprocate therewith as a unit.

The valve stem 80 comprises a cylindrical rod, the top of which is threaded to receive an adjustment nut 84.

The central portion of the valve stem 80 extends through a hollow bushing 86 which guides the reciprocating movement of the valve stem 80. Exterior threads on the lower part of the hollow bushing 86 are received in threaded opening of a guide plate 88 which is fixed to an interior wall of casing 10 by any suitable means (not shown); thus, the bushing 86 is adjustably mounted along the vertical axis of the valve stem 80.

The electrical circuits and the components thereof will be described in their proper order in the following description of the sequence of operation. Referring now to FIG. 1, the relative positions of the various components of the electro magnetic actuator control are shown with the electric coil 36 deenergized. In this condition, the ball valve 70 is biased by coil spring 74 to its closed position in contact with the valve seat 62; the keeper 50 is held to its counterclockwise position about the fulcrum 34 by the tension spring 60 with the keeper end 52 separated from the pole face 32 and with the bifurcated keeper end 58 engaging the bushing 86. The electric coil 36 has a pair of lead wires 90–91 for connection to a control circuit by means of terminal posts 92, 93, 94 on the casing 10. A thermostat 95 is connected across the terminals 92 and 93 and the secondary of a 24-volt transformer 96 is connected across the terminals 93 and 94. The transformer 96 has its primary connected to a source of line voltage by lines L1 and L2.

In certain installation, it is the practice to provide the room thermostat 95 with a heat anticipator (not shown), as is well known in the art. For such installations, the parallel resistance 98 is connected across the electric coil 36 as shown in FIG. 1. The resistance 98 thus acts to furnish a parallel circuit to the electric coil 36 so that the current draw through the combined resistance and electric coil circuits is in the range required for operation of the heat anticipator in the thermostat 95.

In order to minimize chatter and noise, the rectifier 97 converts the alternating current from the secondary of the transformer 96 to pulsating direct current in the circuit branch passing through the electric coil 36. Noise and chatter due to the momentary release action of the pulsating direct current are further diminished by the lag coil 40 which has the effect of retarding demagnetization on pulsation decay. During the intermittent periods of no current from the rectifier 97, between pulsations, magnetization is maintained by the induced current in the lag coil 40 for a part of such a period thereby minimizing the time of negligible magnetization and further minimizing keeper vibration and noise to a negligible level.

While the present invention has a wide variety of uses, it is described herein in connection with a heating system (not shown). The flow of fuel to the heaters of the system is regulated by fuel flow controlling devices which are actuated in response to operation of the ball valve 70; by means of the electromagnetic actuator, the ball valve 70 is operated between controlling positions in response to the room thermostat 95 which may be set to a desired temperature. Assuming now that the room thermostat 95 closes its contacts and the lines L1 and L2 are connected to a source of alternating current, a circuit for energizing the electric coil 36 may be traced as follows: from the secondary of the transformer 96 to the terminal post 94, through the rectifier 97, the lead wire 90, the electric coil 36, the lead wire 91, the terminal post 92, the thermostat 95, and the terminal post 93 to the secondary of the transformer 96.

The completed electric circuit energizes the electric coil 36 which in turn magnetizes the core 24 for attracting the keeper end 52 to enlarged pole face 32. During initial movement of the keeper 50, the bifurcated end 58 moves off of the guide bushing 86 and no motion is transmitted to the control stem 80 because there is no engagement with the adjustment nut 84. Thus, during the initial movement, the magnetic attraction of the keeper end 52 causes the keeper 50 to pivot clockwise about the fulcrum 34 and to overcome the initial force of tension spring 60 but not the biasing force of the compression spring 74. The final movement of the keeper 50 commences when its bifurcated end 58 engages the adjustment nut 84; due to its initial movement, the bifurcated end 58 is provided with an inertia force for its final movement wherein contact with the adjustment nut 84 raises the stem 80 and the ball valve 70 to an open position as shown in FIG. 4. Because of the lost motion connection, the keeper 50 is required to overcome both the tension spring 60 and the compression spring 74 only during its final movement. It is during such final movement that the keeper end 52 approaches the enlarged magnet pole face 32 so that the magnetic attracting force approaches its maximum value when it is required to overcome the bias of both springs 60 and 74.

When the thermostat 95 opens its contacts, the electric circuit means is broken and the electric coil 36 is deenergized. The resulting demagnetization of the magnet core 24 releases the keeper 50 for counterclockwise pivoting about the fulcrum 34 by the return force of the tension spring 60. The bifurcated end 58 is transferred to the guide bushing 86 whereupon the control stem 80 and ball valve 70 are moved downward by the return force of the compression spring 74.

Since the keeper 50 is directly fulcrumed on the edge 34 of the magnet pole 28, the spacial distance between the keeper 50 and the pole faces is maintained at a minimum under pivoting conditions. As is illustrated in FIG. 3, the gap between the keeper end 52 and the enlarged pole face 32 may be adjusted by means of the guide bushing 86 which constitutes the lower abutment for limiting the downward movement of the bifurcated end 58. The alignment of the keeper axis 56 and the fulcrum 34 is maintained under pivoting conditions because of the rotainer 42 which holds the keeper 50 in proper orientation and because of the bracket tabs 20, 22 which prevent the magnet core 24 from rotating.

Referring now to FIG. 4, there is shown an electromagnetic actuator which is adapted to be energized by a thermoelectric current. Inasmuch as the structural elements of FIG. 4 are substantially the same as those of FIGS. 1, 2, and 3, identical reference numerals have been used for identical parts and reference numerals with one hundred added have been used for new or similar parts. Since direct current is utilized in FIG. 4, there is no need for a lag coil so that the bobbin 138 with its electric coil 136 is snugly fitted onto the magnet pole 28. In addition, the parallel resistance and rectifier are eliminated, the transformer is replaced by a thermopile 196 for millivolt operation and a safety device coil 189 is added.

An electric circuit for the electric coil 136 may be traced as follows: from the thermopile 196 to the terminal post 193 through the closed contacts of the room thermostat 195, the terminal post 194, the lead wire 190, the coil 136, the lead wire 191 to ground, thence from ground through the terminal post 192 to the thermopile 196. The safety device coil 189 is in series with the thermopile 196; as long as the thermopile 196 is generating a thermoelectric current, the safety device coil 189 is energized and thus is operated only as a safety measure to cut off the fuel flow controlling devices in the heating system whenever the thermopile is rendered inoperative.

Inasmuch as many changes could be made in the above construction and many apparently widely different embodiments of the present invention could be made without departing from the scope thereof, it is intended that all matter contained in the above description or shown on the accompanying drawings shall be interpreted as illustrative and not in a limiting sense.

What is claimed is:

1. In an electromagnetically operated device, the combination comprising a mounting frame, a bi-polar magnetizable core fixed to said frame, an electrically energizable coil operatively associated with one pole of said core, electric circuit means energizing said coil to cause magnetization of said core, a keeper element movable in one direction in response to magnetization of said core by said coil, spring means disposed between said keeper element and said frame for biasing said keeper element in an opposite direction, fulcrum means on the said one pole of said core defining a pivotal axis for said keeper, a control element operable between a plurality of controlling positions, yieldable means normally biasing said control element toward one controlling position, and adjustably spaced abutment means associated with said control element and being engageable by said keeper element for operating said control element, said keeper element being moved in said one direction with an initial movement away from one of said spaced abutment means and with a final movement in engagement with the other of said spaced abutment means to operate said control element against the bias of its yieldable means to another controlling position.

2. The combination as recited in claim 1 wherein the said other spaced abutment means comprises an adjustment nut threaded onto said control element to selectively vary the initial and final movements of said keeper element.

3. The combination as recited in claim 2 wherein the said one spaced abutment means comprises guide bushing adjustably fixed relative to said control element for guiding the same during its movement.

4. The combination as recited in claim 3 wherein said electric circuit means is provided with a pulsating direct current and said core is provided with means to maintain magnetization between pulsations of such current.

5. The combination as recited in claim 3 wherein said electric circuit means includes a thermopile for generating a thermoelectric current for said coil.

6. The combination as recited in claim 5 wherein said electric circuit means further includes a safety device electrically connected to said thermopile for operation by the thermoelectric current.

7. In an electromagnetically operated device, the combination comprising a bi-polar magnet core, an electrically energizable coil associated with one pole of said magnet core, a keeper pivotally mounted intermediate its ends on said one pole, one end of said keeper being disposed for attraction to the other pole of said magnet core upon energization of said coil, the other pole of said magnet core having an enlarged face for increasing flux to said one end of said keeper, spring means biasing said one end of said keeper away from said other pole upon deenergization of said coil, electric circuit means for energizing said coil including an alternating current transformer and a rectifier to change the alternating current to pulsating direct current, and a lag coil on said one pole of said magnet core and being responsive to said electric coil to retard demagnetization on pulsation decay.

8. In an electromagnetically operated device, the combination comprising a mounting frame, a bi-polar magnetizable core having a base secured to said frame and having a pair of poles extending from said base, an electrically energizable coil disposed in operative relation to said core, electric circuit means for energizing said coil causing magnetization of said core, a fulcrum edge on a face of one of said poles, a keeper pivotally mounted on said edge for movement toward a face of the other of said poles upon magnetization of said core, means on said frame for maintaining said edge in alignment with the pivotal axis of said keeper, spring means connected between said frame and said keeper for biasing the same away from the face of said other pole upon demagnetization of said core, a control stem movable between a plurality of controlling positions, an adjustment nut threaded on said stem for engagement by said keeper upon magnetization of said core, a bushing element guiding the movement of said stem and being adjustably fixed relative to said stem for engagement by said keeper upon demagnetization of said core, said keeper being freely movable between said bushing element and said adjustment nut whereby the motion of said keeper is lost until contact is made with said adjustment nut upon magnetization of said core and until contact is made with said bushing element upon demagnetization of said core.

9. The combination as recited in claim 8 wherein said electric circuit means includes a thermopile generating a thermoelectric current for said coil.

10. The combination as recited in claim 8 wherein said electric circuit means includes means to provide said coil with pulsating direct current and wherein a lag coil is mounted on said one pole of said core to maintain magnetization of said core during periods of no current between pulsations.

References Cited by the Examiner
UNITED STATES PATENTS

| | | | |
|---|---|---|---|
| 2,322,911 | 6/43 | Beam | 251—81 |
| 2,850,258 | 9/58 | Lazich | 251—138 |

M. CARY NELSON, *Primary Examiner.*

MARTIN P. SCHWADRON, JOHN T. BURNS,
*Examiners.*